United States Patent [19]
Sorbie

[11] 3,879,993
[45] Apr. 29, 1975

[54] METHOD AND APPARATUS FOR INSPECTING GLASS CONTAINERS

[75] Inventor: Thomas B. Sorbie, Toledo, Ohio

[73] Assignee: Owens-Illinois, Inc., Toledo, Ohio

[22] Filed: Sept. 28, 1973

[21] Appl. No.: 401,869

[52] U.S. Cl. ............... 73/104; 33/174 Q; 209/88 R
[51] Int. Cl. ........................................ G01n 19/08
[58] Field of Search .................... 73/104; 33/174 Q; 209/88 R

[56] References Cited
UNITED STATES PATENTS

| | | | |
|---|---|---|---|
| 2,353,813 | 7/1944 | Deeren | 73/104 |
| 3,073,034 | 1/1963 | Antoszewski | 33/174 Q |
| 3,101,147 | 8/1963 | Fry et al. | 73/104 X |
| 3,196,550 | 7/1965 | McMeekin | 33/174 Q |
| 3,395,573 | 8/1968 | Baker et al. | 73/104 |
| 3,414,127 | 12/1968 | Sorbie | 209/88 R |
| 3,483,971 | 12/1969 | Spurr et al. | 33/174 Q X |

Primary Examiner—Richard C. Queisser
Assistant Examiner—Joseph W. Roskos
Attorney, Agent, or Firm—D. T. Innis; E. J. Holler

[57] ABSTRACT

An apparatus and method for detecting rim surface defects in glass containers wherein the edge of a loop of a thin, flexible strip of mechanically durable tape is placed in contact with the sealing rim surface of the glass container while the surface is rotated. The loop of tape is supported in such a manner that it will be flexed or deflected when the lower edge of the loop is contacted by a defect and the deflection of the loop will close a contact, completing a circuit for indicating the presence of a defect in the container. The particular arrangement of the mounting of the tape and the steadying means for the bottle are such that these elements are at a preselected or preset, constant level and the container is brought into and rotated in the inspection station without requiring relative vertical movement of the container and the sensing head.

14 Claims, 4 Drawing Figures

3,879,993

METHOD AND APPARATUS FOR INSPECTING GLASS CONTAINERS

CROSS-REFERENCES TO RELATED APPLICATIONS

The specific type of defect which the present invention is particularly adapted to detect is known in the art as a line-over-finish defect and is disclosed and discussed in U.S. Pat. No. 3,355,980, to Benny B. Mathias.

The general system and idea of using a mechanical feeler for detecting line-over-finish defects is disclosed in applicant's prior U.S. Pat. No. 3,414,127 issued Dec. 3, 1968. Reference may also be had to a commonly assigned U.S. Pat. No. 3,395,573 which discloses the use of an edge of a piece of film as the mechanical feeler for a line-over-finish defect detecting arrangement. Both of the above-referenced patents sense the vibration of the tape or film by the use of a phonograph stylus or pick-up.

BACKGROUND OF THE INVENTION

Most "line-over-finish" defects are produced by the entrapment within the molten glass of an air bubble which is elongated during the movement of the glass into the neck rings either by a settle-blow or by a plunger pressing operation. The blisters which are elongated in the forming of the container necks frequently open out through the surface of the container in the neck area. These elongated blisters frequently occur over the top or sealing surface of the container neck or finish, thus producing the surface defect which is termed "line-over-finish".

It has been the practice in the past to examine containers for line-over-finish defects by directing a beam of light into the surface to be inspected and relying on the reflective nature of the defect as a means for providing a signal in response to the presence of a defect. These prior devices unfortunately are only effective in those situations where the defect is oriented in such a manner that the light will be reflected from the defect to a prepositioned photo-sensitive pick-up.

It has been applicant's experience that line-over-finish defects which are produced during the parison forming portion of the glass container manufacturing process are not always oriented in such a manner as to be picked up by a single light source and photocell.

It has also been proposed that these surface defects be detected through the use of a vibration sensitive pick-up such as a phonograph pick-up wherein the needle is held against the surface to be tested, with the output of the pick-up being fed to a recorder or indicating instrument. It has been applicant's experience in adapting such a system to the detection of line-over-finish defects in containers that the needles have relatively poor wearing quality with respect to the type of surface being checked. Additionally, it has been found that these needles often sense non-detrimental surface defects such as those found on slightly rough finishes. This causes the rejection of commercially acceptable glassware. Furthermore, since these defects are of varied orientation and configurations, frequently the needles used as the defect sensitive member become chipped or broken. This presents a costly maintenance problem, particularly with respect to the operation of an inspection system which is intended to have an extended inplant operation without substantial maintenance. It should be obvious that it is highly desirable to eliminate those containers which possess line-over-finish defects because of the strong likelihood that an imperfect seal will result when these are filled and capped.

One successful, commercially used, line-over-finish defect detection device is that disclosed in U.S. Pat. No. 3,414,127. In this particular patent, the end edge of a piece of metal tape is positioned at the inspection station and the container raised into contact with the tape. The container is then rotated and the tape, when encountering a defect, will buckle. This buckling of the tape is sensed by a phonograph-type stylus with the signal then being processed to provide an indication of a defective container. This particular apparatus requires, in its operation, that the container be brought into a particular position and then raised so that the tape is brought into contact with the sealing surface of the container when the container is in the station. Obviously, rather than raising the container, the inspection head could be lowered onto the container surface. However, relative vertical movement must be a prerequisite to placing the inspection head in proper inspecting position.

The present invention, by its design of the feeler element being in the form of a loop of tape, can be prepositioned, the container brought into station, without the requirement of relative vertical displacement of the container and the feeler inspection may be carried out, completed and the container moved out of the inspection station, here again, without the necessity of raising or lowering the container or raising or lowering the inspection head during transfer into and out of the inspection station.

SUMMARY OF THE INVENTION

A method and apparatus for inspecting glass containers for defects in the sealing surface thereof wherein the containers are brought successively into the inspection station, stabilized while in the station and rotated about their vertical axes. A loop of metal tape, the lower edge portion being positioned below the normal height of the container, is positioned at the inspection station such that entry of the bottle into the inspection station will place the lowermost edge of the loop in contact with the sealing edge of the container. Rotation of the container relative to the loop of tape provides an inspection scan of the container sealing surface and deflection of the loop of tape is sensed as an indication of the presence of a defect.

Figure 4:
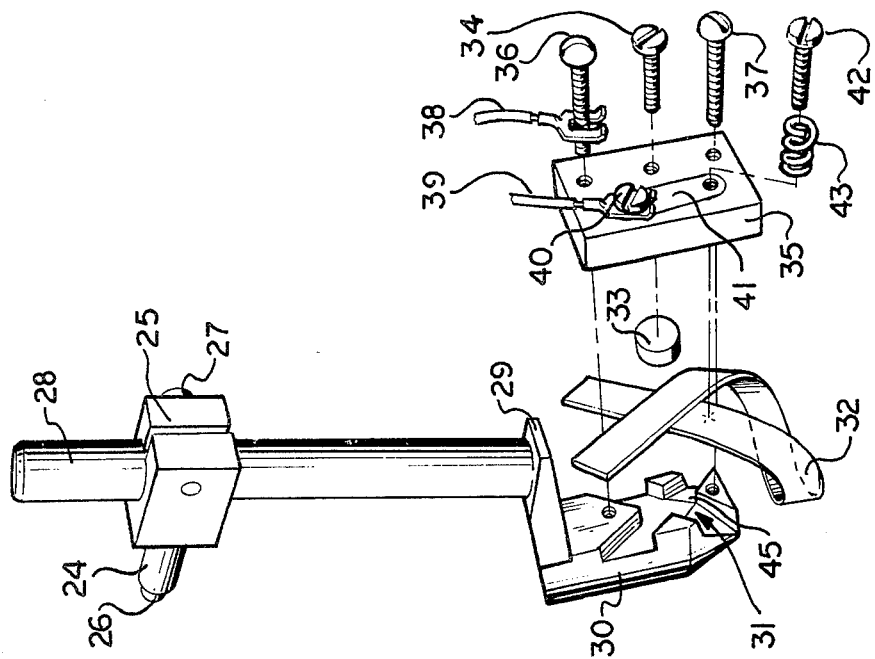
FIG. 4 is an exploded view, on an enlarged scale, of the sensing head of FIG. 1 and its mounting arrangement.

It should be kept in mind that the apparatus of the invention is used in conjunction with a bottle handling system for containers generally similar to that shown and described in U.S. Pat. No. 3,414,127 issued Dec. 3, 1968 to the present inventor.

Generally speaking, the handling system for the containers to be inspected takes the form of a platform 10 which supports the containers as they are moved from station to station in the manner taught in the above-referred-to U.S. Pat. No. 3,414,127. The containers are slid on their bottoms by engagement of a starwheel 11 and are confined in the pocket of the starwheel by an opposed rail 12. At the inspection station of the present invention, a pad 13 is positioned with its upper surface at approximately the same elevation as the platform 10. The pad 13 is supported by a shaft 14 which is rotatably driven by a mechanism (not shown) in the direction of the arrow shown on the container in FIG. 1. Bottle steadying and gauging mechanism of the present invention are mounted on a generally horizontal rod 15 which is supported to the left, as viewed in FIG. 1, with the rod extending generally radially with respect to the starwheel 11. A pair of rollers 16 and 17 below the rod 15 are rotatably mounted on shafts 18 and 19. The shafts 18 and 19 are carried by swivel mounted supporting levers 20 and 21 which in turn are mounted on brackets 22' and 23' which are adjustably clamped to the rod 15. Helical tension springs 20' and 21' bias the rollers 16 and 17 with a bottle engaging downward force. The angle at which the shafts 18 and 19 are set is shown as approximately 22.5°; however, this angle is not critical, it being understood that the rollers 16 and 17 are set and positioned such that when a container is brought into the inspection position, diametrically opposed points on the upper rim surface of the container will be in engagement with the rollers. Thus, in effect, the rollers 16 and 17 serve as a means for steadying the upper finish or rim surface of the container and holding the container down in frictional engagement with the pad 13.

Figure 1:
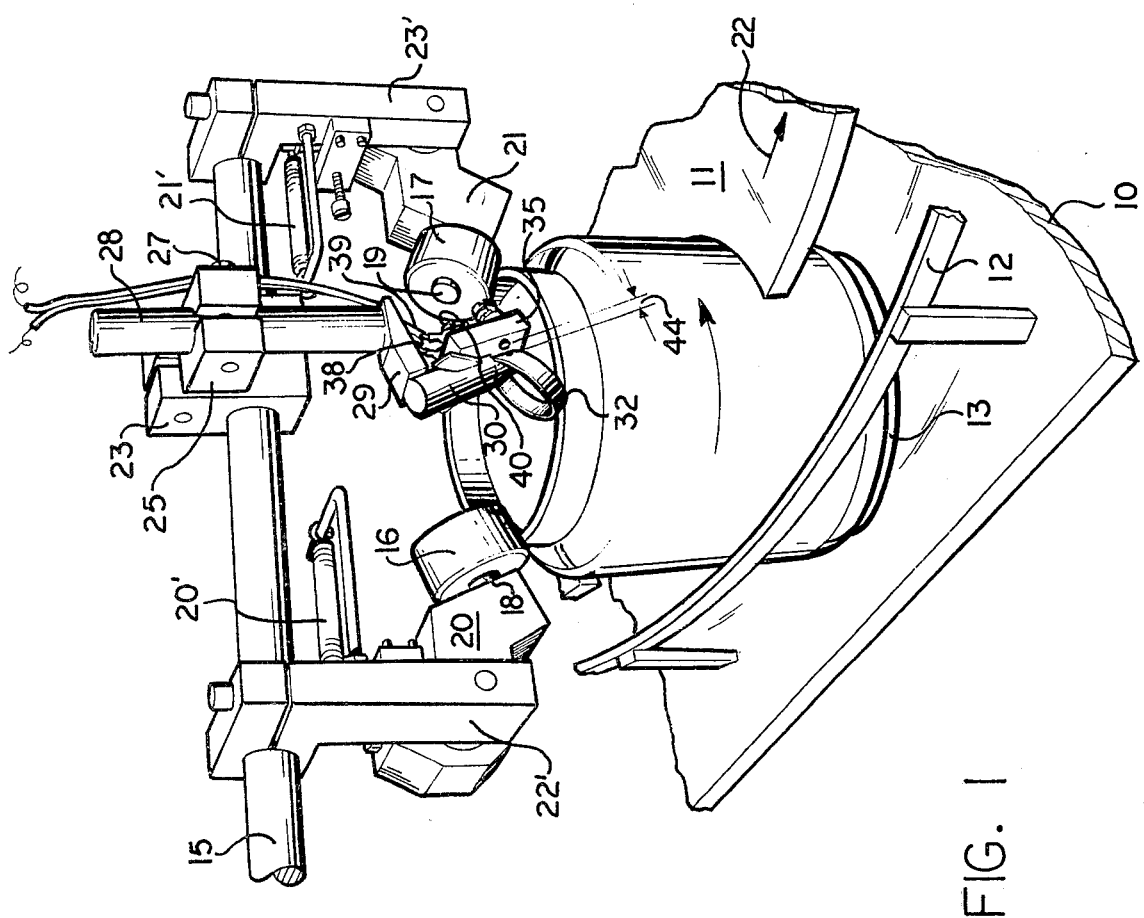
FIG. 1 is a perspective view of a container in the inspection station, with the inspection apparatus in gauging position.
Figure 3:
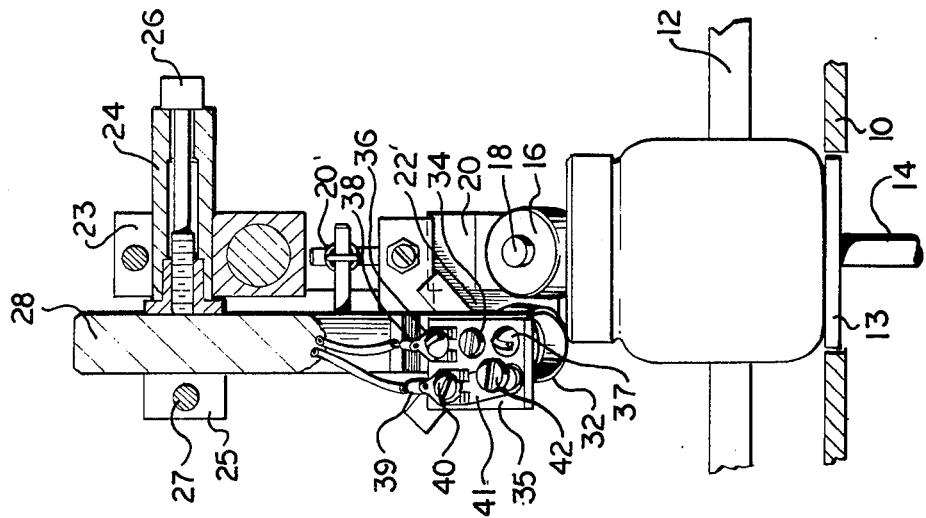
FIG. 3 is a cross-sectional view taken at line 3—3 of FIG. 2.
Figure 2:
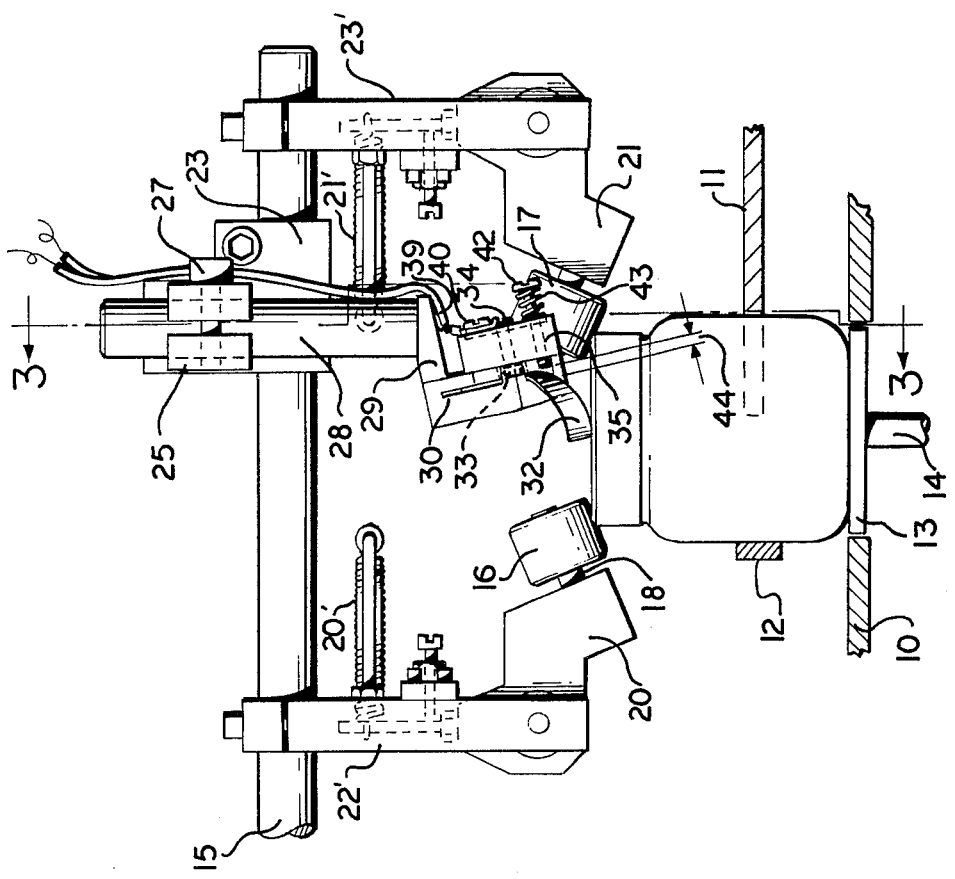
FIG. 2 is a side elevational view of the apparatus of FIG. 1.

As previously explained, the containers are brought into the inspection position by indexing of the starwheel 11 and this movement will be in the direction indicated by the arrow 22 in FIG. 1. A clamp 23 fixed to rod 15 supports a sleeve 24 to which is connected a clamp 25. As can best be seen in FIG. 3, the sleeve 24 and clamp 25 are held in engagement with each other by a screw 26. When the screw 26 is tightened, it will effectively hold the two clamps 23 and 25 in rigid, joined relationship. Clamp 25 also carries a threaded screw 27 which extends through the bifurcated portion of the clamp 25 such that by manipulation of the screw 27, a rod 28 may be adjusted vertically with respect to the fixed supporting rod 15. The lower end of the rod 28 has a plate 29 fixed thereto at a slight downward angle and to the edge of plate 29 is fixed a semi-cylindrical body 30. In actual practice, the plate 29 and body 30 are welded together and, in turn, plate 29 is welded to the rod 28.

As best seen in FIG. 4, the flat face of the body 30 is made with an X-shaped recessed area 31. The width of the X-shaped recess is such that a flat metal tape 32, formed with a downwardly extending loop portion, may lie within the X-shaped recess, with the two free ends in overlapping relationship, as shown in FIG. 4. The tape is held in the tape holder or body 30 by the force of a pad 33 held thereagainst by a screw 34 threaded in an insulating block 35. The block 35 is held against the body 30 by a pair of screws 36 and 37. The screw 36 also serves as the clamp for an electrical lead 38 and, in effect, electrically connects the lead 38 to the body 30, it being understood, as previously stated, that the block 35 is formed of an insulating material. A second lead 39 is held against the face of the block 35 by a short screw 40 and a conductive plate 41 is interposed the head of the screw and block 35 and serves to connect lead 39 to a screw 42. Screw 42 is adjustable relative to its spacing from body 30 and tape 32 and is positioned such that deflection of the tape 32 by a defect in the container rim will result in the tape 32 touching the end of the screw 42. Screw 42 is held in its adjusted position by the interpositioning of a helical spring 43. The spacing between the end of the screw 42 and the tape 32 represented by the gap 44 may be adjusted by rotation of the screw 42 to change the sensitivity level of the response of the gauging instrument.

As can readily be seen when the tape is deflected sufficiently to contact the end of the screw 42, an electrical circuit may be completed through the screw 42, the spring 43, the plate 41 to the screw 40 and from the body 30 through the screw 36 to the lead 38. In effect, completion of the circuit may be used as an indication of the presence of a defect in the sealing surface of the container.

The looped tape may also be shifted relative to the holder 30 by changing the relative position of the ends after loosening of the screw 34 and pad 33 to thus provide a new edge of the tape as the actual portion thereof that touches the finish of the container.

It should also be observed that the lower portion 45 of the X-recess in the face of holder 30 presents a tapered cut in the direction of the loop so that deflection is more easily accomplished when a defect is encountered. Also, the tape will lie in the recess in a more natural state with the tapering of the lower portion of the surface against which it rests.

I claim:

1. In apparatus for inspecting glass containers for defects in the rim or sealing surface thereof comprising, container indexing means for successively presenting containers to an inspection station, means at said station for rotating a container about its vertical axis, a stationary member extending over said station, a pair of spaced-apart, downwardly extending arms connected to said stationary support, pivot means at the lower end of each said arm, container rim contacting rollers mounted on said pivot means for steadying and centering the container during rotation, resilient means biasing said rollers in container contacting direction, a thin strip of flexible, resilient tape, a support for holding said tape in a downwardly angled loop with the lower edge of the loop portion of the tape in contact with the rim surface of the container, said looped tape being sufficiently resilient to yield upwardly as a container is brought into station and means carried by said support for sensing the distortion of said loop when encountered by a defect in the container rim.

2. The apparatus of claim 1 wherein said support comprises a semi-cylindrical body having a generally X-shaped slot in the flat face thereof and the tape loop is formed by overlapping the free ends of the tape in the X slot and clamping the tape in place.

3. The apparatus of claim 2 including a non-conductive plate overlying the face of said body, a clamping screw extending through said plate and adapted to clamp the overlapped portion of the tape for maintaining the tape in a loop.

4. The apparatus of claim 2 wherein said tape support is mounted to contact the container at about 90° with respect to the position of the rollers.

5. The apparatus of claim 3 wherein said sensing means comprises a screw extending through the plate with its end terminating short of the tape and circuit means connected to said screw for indicating when the tape is deflected an amount sufficient to contact the end of said screw.

6. The apparatus of claim 3 wherein said tape support is mounted to contact the container at about 90° with respect to the position of the rollers.

7. The apparatus of claim 5 wherein the looped tape contacts the rim of the container with its width being at an angle of about 60° with respect to the horizontal.

8. The apparatus of claim 5 wherein said tape support is mounted to contact the container at about 90° with respect to the position of the rollers.

9. The apparatus of claim 7 wherein said tape support is mounted to contact the container at about 90° with respect to the position of the rollers.

10. The apparatus of claim 1 wherein the looped tape contacts the rim of the container with its width being at an angle of about 60° with respect to the horizontal.

11. The apparatus of claim 1 wherein said tape support is mounted to contact the container at about 90° with respect to the position of the rollers.

12. The apparatus of claim 11 wherein said rollers are relatively, diametrically opposed and their surfaces contact the containers at an angle of about 15° – 30° with respect to the horizontal.

13. The apparatus of claim 12 wherein said rollers contact opposed edges of the rim of the container at substantially 90° with respect to the line of movement of the container into the inspection station and are prepositioned so that the container indexing means moves the containers into contact with the rollers.

14. The apparatus of claim 13 wherein said tape loop is prepositioned and the container indexing means brings the container into contact with the loop.

* * * * *